US006905667B1

(12) United States Patent
Chen et al.

(10) Patent No.: US 6,905,667 B1
(45) Date of Patent: Jun. 14, 2005

(54) POLYMER AND METHOD FOR USING THE POLYMER FOR NONCOVALENTLY FUNCTIONALIZING NANOTUBES

(75) Inventors: Jian Chen, Richardson, TX (US); Haiying Liu, Houghton, MI (US)

(73) Assignees: Zyvex Corporation, Richardson, TX (US); The University of Pittsburgh, Pittsburgh, PA (US)

( * ) Notice: Subject to any disclaimer, the term of this patent is extended or adjusted under 35 U.S.C. 154(b) by 83 days.

(21) Appl. No.: 10/318,730

(22) Filed: Dec. 13, 2002

Related U.S. Application Data

(60) Provisional application No. 60/377,920, filed on May 2, 2002.

(51) Int. Cl.[7] ............................................. C01B 31/02
(52) U.S. Cl. .............................. 423/447.1; 423/445 R; 423/460; 428/367; 428/398; 428/408; 524/495; 524/496; 525/416
(58) Field of Search .................................. 428/367, 398, 428/408; 525/416; 423/445 B, 445 R, 460; 524/495, 496

(56) References Cited

U.S. PATENT DOCUMENTS

| 5,204,038 | A | 4/1993 | Heeger et al. |
| 5,281,406 | A | 1/1994 | Stalling et al. |
| 5,482,601 | A | 1/1996 | Ohshima et al. |
| 5,753,088 | A | 5/1998 | Olk |
| 5,968,650 | A | 10/1999 | Tennent et al. |
| 6,113,819 | A | 9/2000 | Tennent et al. |
| 6,180,114 | B1 | 1/2001 | Yager et al. |
| 6,187,823 | B1 | 2/2001 | Haddon et al. |
| 6,203,814 | B1 | 3/2001 | Fisher et al. |
| 6,331,262 | B1 | 12/2001 | Haddon et al. |
| 6,368,569 | B1 | 4/2002 | Haddon et al. |
| 6,422,450 | B1 | 7/2002 | Zhou et al. |
| 6,426,134 | B1 | 7/2002 | Lavin et al. |
| 6,576,341 | B1 | 6/2003 | Davey et al. |
| 2001/0010809 | A1 | 8/2001 | Haddon et al. |
| 2001/0016283 | A1 | 8/2001 | Shiraishi et al. |
| 2001/0016608 | A1 | 8/2001 | Haddon et al. |
| 2002/0008956 | A1 | 1/2002 | Niu |
| 2002/0034757 | A1 | 3/2002 | Cubicciotti |
| 2002/0046872 | A1 | 4/2002 | Smalley et al. |
| 2002/0048632 | A1 | 4/2002 | Smalley et al. |
| 2002/0049495 | A1 | 4/2002 | Kutryk et al. |
| 2002/0053522 | A1 | 5/2002 | Cumings et al. |
| 2002/0068170 | A1 | 6/2002 | Smalley et al. |
| 2002/0102617 | A1 | 8/2002 | MacBeath et al. |
| 2002/0117659 | A1 | 8/2002 | Lieber et al. |
| 2003/0001141 | A1 | 1/2003 | Sun et al. |
| 2003/0168756 | A1 * | 9/2003 | Balkus et al. .................. 264/10 |
| 2004/0241900 | A1 | 12/2004 | Tsukamoto et al. |

FOREIGN PATENT DOCUMENTS

| JP | 2003096313 | 4/2003 |
| JP | 2003292801 | 10/2003 |
| WO | WO 99/57222 A1 | 11/1999 |
| WO | WO00/44094 A1 | 7/2000 |
| WO | WO 02/16257 A2 | 8/2001 |
| WO | WO 02/076888 A1 | 10/2002 |
| WO | WO02/88025 A1 | 11/2002 |
| WO | WO 02/095099 A1 | 11/2002 |

OTHER PUBLICATIONS

Darlene K. Taylor and Edward T. Samulski; *Synthesis and Characterization of Poly (p–phenylene)s with Nonlinear Optical Side Chains*; Macromolecules 2000, 33, pp. 2355–2358.

S. J. Sutton and A. S. Vaughan; *On the morphology and growth of electrochemically polymerized polypyrrole;* Polymer vol. 36, No. 9, pp. 1849–1857, 1995.

Jean Roncali; *Synthetic Principles for Bandgap Control in Linear π–Conjugated Systems;* Chem. Rev. 1997, 97, pp. 173–205.

Nikolaev, P. et al., "Gas–phase catalytic growth of single–walled carbon nanotubes from carbon monoxide," Chemical Physics Letters 313 (1999) pp. 91–97.

Journet, C. et al., "Production of carbon nanotubes," Appl. Phys. A 67, (1998) pp. 1–9.

Journet, C. et al., "Large–scale production of single–walled carbon nanotubes by the electric–arc technique," NATURE, vol. 388, 1997, pp. 756–758.

Rinzler, A. et al., "Large–scale purification of single–wall carbon nanotubes: process, product, and characterization," Appl. Phys. A 67, 1998, pp. 29–37.

Yakobson, B. et al., "Fullerene Nanotubes $C_{1,000,000}$ and Beyond," American Scientist, vol. 85 1997, pp. 324–337.

O'Connell, M. et al., "Reversible water–solubilization of single–walled carbon nanotubes by polymer wrapping," Chemical Physics Letters 342, 2001, pp. 265–271.

Dalton, A. et al., "Selective Interaction of a Semiconjugated Organic Polymer with Single–Wall Nanotubes," J. Phys. Chem. B 2000, 104, pp. 10012–10016.

(Continued)

*Primary Examiner*—Bernard Lipman
(74) *Attorney, Agent, or Firm*—Haynes and Boone, L.L.P.

(57) ABSTRACT

A new, non-wrapping approach to functionalizing nanotubes, such as carbon nanotubes, in organic and inorganic solvents is provided. In accordance with certain embodiments, carbon nanotube surfaces are functionalized in a non-wrapping fashion by functional conjugated polymers that include functional groups. Various embodiments provide polymers that noncovalently bond with carbon nanotubes in a non-wrapping fashion. For example, various embodiments of polymers are provided that comprise a relatively rigid backbone that is suitable for noncovalently bonding with a carbon nanotube substantially along the nanotube's length, as opposed to about its diameter. In preferred polymers, the major interaction between the polymer backbone and the nanotube surface is parallel π-stacking. In certain implementations, the polymers further comprise at least one functional extension from the backbone that are any of various desired functional groups for functionalizing a carbon nanotube.

28 Claims, 5 Drawing Sheets

OTHER PUBLICATIONS

Star, A. et al., "Preparation and Properties of Polymer-Wrapped Signle–Walled Carbon Nanotubes," Angew. Chem. Int. Ed. 2001, 40, No. 9, pp. 1721–1725.

Georgakilas, V. et al., "Organic Functionalization of Carbon Nanotubes," J. Am. Chem. Soc. 2002. vol. 124, No. 5, pp. 760–761.

Boul, P. et al., "Reversible sidewall functionalization of buckytubes," Chemical Physics Letters 310, 1999, pp. 367–372.

Chen, R. et al., "Noncovalent Sidewall Functionalization of Single–Walled Carbon Nanotubes for Protein Immobilization," J. Am. Chem. Soc. 2001, 123, pp. 3838–3839.

Calvert, P., "A recipe for strength," NAUTRE, vol. 399, 1999, pp. 210–211.

Ebbesen, T., "Cones and Tubes: Geometry in the chemistry of Carbon," Acc. Cem. Res. 1998, 31, pp. 558–566.

Bunz, U., "Poly(aryleneethynylene)s: Syntheses, Properties, Structur s, and Applications," Chem. Rev. 2000, 100, pp. 1605–1644.

McQuade, D. et al., "Signal Amplification of a "Turn–On" Sensor: Harvesting the Light Captured by a conjugated Polymer," J. Am. Chem. Soc. 2000, 122, pp. 12389–12390.

Schadler, L. et al., "Load transfer in carbon nanotube epoxy composites," Applied Physics Letters, 1998 vol. 73, No. 26, pp. 3842–3844.

Ajayan, P. et al., "Single–Walled Carbon Nanotube–Polymer Composites: Strength and Weakness," Adv. Mater. 2000, 12, No. 10, pp. 750–753.

Y. Chen, J. Fitz Gerald, J. S. Williams, P. Willis; *Mechanochemical Synthesis of Boron Nitride Nanotubes;* Materials Science Forum vols. 312–314 (1999) pp. 173–177; Journal of Metastable and Nanocrystalline Materials vol. 2–6 (1999) pp. 173–177; 1999 Trans Tech Publications, Switzerland.

Weiqiang Han, Yoshio Bando, Keiji Kurashima, Tadao Sato; *Synthesis of boron nitride nanotubes from carbon nanotubes by a substation reaction;* Applied Physics Letters vol. 73, No. 21; pp. 3085–3087, Nov. 23, 1998.

* cited by examiner

POLYMER AND METHOD FOR USING THE POLYMER FOR NONCOVALENTLY FUNCTIONALIZING NANOTUBES

CROSS-REFERENCE TO RELATED APPLICATIONS

This application claims priority to Provisional Patent Application Ser. No. 60/377,920 entitled "SYSTEM AND METHOD FOR FUNCTIONALIZATION OF NANOTUBE SURFACES", filed May 2, 2002, the disclosure of which is hereby incorporated herein by reference.

TECHNICAL FIELD

The present invention is related to functionalization of nanotubes, and more particularly to a polymer that is capable of noncovalently bonding to a nanotube's sidewall for functionalizing the nanotube.

BACKGROUND OF THE INVENTION

A carbon nanotube can be visualized as a sheet of hexagonal graph paper rolled up into a seamless tube and joined. Each line on the graph paper represents a carbon-carbon bond, and each intersection point represents a carbon atom.

In general, carbon nanotubes are elongated tubular bodies which are typically only a few atoms in circumference. The carbon nanotubes are hollow and have a linear fullerene structure. The length of the carbon nanotubes potentially may be millions of times greater than their molecular-sized diameter. Both single-walled carbon nanotubes (SWNTs), as well as multi-walled carbon nanotubes (MWNTs) have been recognized.

Carbon nanotubes are currently being proposed for a number of applications since they possess a very desirable and unique combination of physical properties relating to, for example, strength and weight. Carbon nanotubes have also demonstrated electrical conductivity. See Yakobson, B. I., et al., *American Scientist*, 85, (1997), 324–337; and Dresselhaus, M. S., et al., Science of Fullerenes and Carbon Nanotubes, 1996, San Diego: Academic Press, pp. 902–905. For example, carbon nanotubes conduct heat and electricity better than copper or gold and have 100 times the tensile strength of steel, with only a sixth of the weight of steel. Carbon nanotubes may be produced having extraordinarily small size. For example, carbon nanotubes are being produced that are approximately the size of a DNA double helix (or approximately $1/50,000^{th}$ the width of a human hair).

Considering the excellent properties of carbon nanotubes, they are well suited for a variety of uses, from the building of computer circuits to the reinforcement of composite materials, and even to the delivery of medicine. As a result of their properties, carbon nanotubes may be useful in microelectronic device applications, for example, which often demand high thermal conductivity, small dimensions, and light weight. One potential application of carbon nanotubes that has been recognized is their use in flat-panel displays that use electron field-emission technology (as carbon nanotubes can be good conductors and electron emitters). Further potential applications that have been recognized include electromagnetic shielding, such as for cellular telephones and laptop computers, radar absorption for stealth aircraft nano-electronics (including memories in new generations of computers), and use as high-strength, light-weight composites. Further, carbon nanotubes are potential candidates in the areas of electrochemical energy storage systems (e.g., lithium ion batteries) and gas storage systems.

Various techniques for producing carbon nanotubes have been developed. As examples, methods of forming carbon nanotubes are described in U.S. Pat. Nos. 5,753,088 and 5,482,601, the disclosures of which are hereby incorporated herein by reference. The three most common techniques for producing carbon nanotubes are: 1) laser vaporization technique, 2) electric arc technique, and 3) gas phase technique (e.g., HiPco™ process), which are discussed further below.

In general, the "laser vaporization" technique utilizes a pulsed laser to vaporize graphite in producing the carbon nanotubes. The laser vaporization technique is further described by A. G. Rinzler et al. in *Appl. Phys. A*, 1998, 67, 29, the disclosure of which is hereby incorporated herein by reference. Generally, the laser vaporization technique produces carbon nanotubes that have a diameter of approximately 1.1 to 1.3 nanometers (nm). Such laser vaporization technique is generally a very low yield process, which requires a relatively long period of time to produce small quantities of carbon nanotubes. For instance, one hour of laser vaporization processing typically results in approximately 100 milligrams of carbon nanotubes.

Another technique for producing carbon nanotubes is the "electric arc" technique in which carbon nanotubes are synthesized utilizing an electric arc discharge. As an example, single-walled nanotubes (SWNTs) may be synthesized by an electric arc discharge under helium atmosphere with the graphite anode filled with a mixture of metallic catalysts and graphite powder (Ni:Y;C), as described more fully by C. Journet et al. in *Nature* (London), 388 (1997), 756. Typically, such SWNTs are produced as close-packed bundles (or "ropes") with such bundles having diameters ranging from 5 to 20 nm. Generally, the SWNTs are well-aligned in a two-dimensional periodic triangular lattice bonded by van der Waals interactions. The electric arc technique of producing carbon nanotubes is further described by C. Journet and P. Bernier in *Appl. Phys. A*, 67, 1, the disclosure of which is hereby incorporated herein by reference. Utilizing such an electric arc technique, the average carbon nanotube diameter is typically approximately 1.3 to 1.5 nm and the triangular lattice parameter is approximately 1.7 nm. As with the laser vaporization technique, the electric arc production technique is generally a very low yield process that requires a relatively long period of time to produce small quantities of carbon nanotubes. For instance, one hour of electric arc processing typically results in approximately 100 milligrams of carbon nanotubes.

More recently, Richard Smalley and his colleagues at Rice University have discovered another process, the "gas phase" technique, which produces much greater quantities of carbon nanotubes than the laser vaporization and electric arc production techniques. The gas phase technique, which is referred to as the HiPco™ process, produces carbon nanotubes utilizing a gas phase catalytic reaction. The HiPco process uses basic industrial gas (carbon monoxide), under temperature and pressure conditions common in modern industrial plants to create relatively high quantities of high-purity carbon nanotubes that are essentially free of by-products. The HiPco process is described in further detail by P. Nikolaev et al. in *Chem. Phys. Lett.*, 1999, 313, 91, the disclosure of which is hereby incorporated herein by reference.

While daily quantities of carbon nanotubes produced using the above-described laser vaporization and electric arc techniques are approximately 1 gram per day, the HiPco process may enable daily production of carbon nanotubes in quantities of a pound or more. Generally, the HiPco technique produces carbon nanotubes that have relatively much smaller diameters than are typically produced in the laser vaporization or electric arc techniques. For instance, the nanotubes produced by the HiPco technique generally have diameters of approximately 0.7 to 0.8 nm.

Molecular engineering (e.g., cutting, solubilization, chemical functionalization, chromatographic purification, manipulation and assembly) of single-walled carbon nanotubes (SWNTs) is expected to play a vital role in exploring and developing the applications of carbon nanotubes. Non-covalent functionalization of carbon nanotubes has received particular growing interest recently, because it offers the potential to add a significant degree of functionalization to carbon nanotube surfaces (sidewalls) while still preserving nearly all of the nanotubes' intrinsic properties. For example, SWNTs can be solubilized in organic solvents and water by polymer wrapping (see e.g., (a) Dalton, A. B.; et al, *J. Phys. Chem. B* 2000, 104, 10012–10016; (b) Star, A.; et al. *Angew. Chem., Int. Ed.* 2001, 40, 1721–1725; (c) O'Connell, M. J.; et al. *Chem. Phys. Lett.* 2001, 342, 265–271; and published U.S. Patent Application Nos. 2002/0046872, 2002/0048632, and 2002/0068170 by Richard B. Smalley, et al., each titled "POLYMER-WRAPPED SINGLE WALL CARBON NANOTUBES"), and nanotube surfaces can be noncovalently functionalized by adhesion of small molecules for protein immobilization (see e.g., Chen, R. J.; et al. *J. Am. Chem. Soc.* 2001, 123, 3838–3839).

Full-length (unshortened) carbon nanotubes, due to their high aspect ratio, small diameter, light weight, high strength, high electrical- and thermal-conductivity, are recognized as the ultimate carbon fibers for nanostructured materials. See Calvert, P. *Nature* 1999, 399, 210, and Andrews, R. et al. *Appl. Phys. Lett.* 1999, 75, 1329, the disclosures of which are hereby incorporated herein by reference. The carbon nanotube materials, however, are insoluble in common organic solvents. See Ebbesen, T. W. *Acc. Chem. Res.* 1998, 31, 558–556, the disclosure of which is hereby incorporated herein by reference.

Covalent side-wall functionalizations of carbon nanotubes can lead to the dissolution of carbon nanotubes in organic solvents. It should be noted that the terms "dissolution" and "solubilization" are used interchangeably herein. See Boul, P. J. et al., *Chem Phys. Lett.* 1999, 310, 367 and Georgakilas, V. et al., *J. Am. Chem. Soc.* 2002, 124, 760–761, the disclosures of which are hereby incorporated herein by reference. The disadvantage of this approach is that a carbon nanotube's intrinsic properties are changed significantly by covalent side-wall functionalizations.

Carbon nanotubes can also be solubilized in organic solvents and water by polymer wrapping. See Dalton, A. B. et al., *J. Phys. Chem. B* 2000, 104, 10012–10016, Star, A. et al. *Angew. Chem., Int. Ed.* 2001, 40, 1721–1725; O'Connell, M. J. et al. *Chem. Phys. Lett.* 2001, 342, 265–271; and published U.S. Patent Application Numbers 2002/0046872, 2002/0048632, and 2002/0068170 by Richard E. Smalley, et al., each titled "POLYMER-WRAPPED SINGLE WALL CARBON NANOTUBES", the disclosures all of which are hereby incorporated herein by reference. FIGS. 1A–1C show examples of such polymer wrapping of a carbon nanotube. In polymer wrapping, a polymer "wraps" around the diameter of a carbon nanotube. For instance, FIG. 1 shows an example of polymers 102A and 102B wrapping around single-walled carbon nanotube (SWNT) 101. FIG. 1B shows an example of polymer 103A and 103B wrapping around SWNT 101. FIG. 1C shows an example of polymers 104A and 104B wrapping around SWNT 101. It should be noted that the polymers in each of the examples of FIGS. 1A–1C are the same, and the FIGURES illustrate that the type of polymer-wrapping that occurs is random (e.g., the same polymers wrap about the carbon nanotube in different ways in each of FIGS. 1A–1C).

One disadvantage of this approach is that the polymer is very inefficient in wrapping the small-diameter single-walled carbon nanotubes produced by the HiPco process because of high strain conformation required for the polymer. For example, such polymer wrapping approach can only solubilize the $SWNTs_{HiPco}$ (i.e., SWNTs produced by the HiPco process) at about 0.1 mg/ml in organic solvents. $SWNT_{HiPco}$ is the only SWNT material that can be currently produced at a large scale with high purity. Further, polymer-wrapping offers no control over the spacing of functional groups that may be arranged along the polymer. That is, as the polymer wraps around a nanotube, which as the examples of FIGS. 1A–1C illustrate may be in a random manner, the spacing of functional groups that may be included on the polymer is uncontrolled.

BRIEF SUMMARY OF THE INVENTION

The present invention is directed to a method for functionalizing nanotubes, a polymer for functionalizing nanotubes, and resulting compositions of matter that may be formed when a polymer is noncovalently bonded with a nanotube. Embodiments of the present invention provide a new approach to functionalizing nanotubes, such as carbon nanotubes. In accordance with certain embodiments of the present invention, carbon nanotube surfaces are functionalized in a non-wrapping fashion by functional conjugated polymers. As used herein, "non-wrapping" means not enveloping the diameter of a nanotube. Thus, associating a polymer with a nanotube in a "non-wrapping fashion" encompasses any association of the polymer with the nanotube in which the polymer does not completely envelop the diameter of the nanotube. When describing certain embodiments of the present invention, the non-wrapping fashion may be further defined and/or restricted. For instance, in a preferred embodiment of the present invention, a polymer can associate with a nanotube (e.g., via π-stacking interaction therewith) wherein the polymer's backbone extends substantially along the length of the nanotube without any portion of the backbone extending over more than half of the nanotube's diameter in relation to any other portion of the polymer's backbone.

Various embodiments provide polymers that associate with carbon nanotubes in a non-wrapping fashion. More specifically, various embodiments of polymers are provided that comprise a relatively rigid backbone that is suitable for associating with a carbon nanotube substantially along the nanotube's length, as opposed to about its diameter. In preferred polymers, the major interaction between the polymer backbone and the nanotube surface is parallel π-stacking. Such interaction may result in the polymer noncovalently bonding (or otherwise associating) with the nanotube. Examples of rigid functional conjugated polymers that may be utilized in embodiments of the present invention include, without limitation, poly(aryleneethynylene)s and poly(3-decylthiophene). In accordance with certain embodiments of the present invention, the polymers further comprise at least one functional extension from the backbone for functionalizing the nanotube.

In one embodiment of the present invention, a polymer for functionalizing nanotubes is disclosed. The polymer comprises a backbone portion for noncovalently bonding with a nanotube in a non-wrapping fashion. In certain implementations, the polymer may further comprise at least one functional portion for functionalizing the nanotube.

In another embodiment of the present invention, a method of functionalizing a nanotube is disclosed. The method comprises mixing a polymer with a nanotube, and the polymer noncovalently bonding with the nanotube in a non-wrapping fashion, wherein the polymer comprises at least one functional portion for functionalizing the nanotube. As used herein, "mixing" is intended to encompass "adding," "combining," and similar terms for presenting at least one polymer to at least one nanotube.

In another embodiment, a method of solubilizing carbon nanotubes is provided. The method comprises mixing at least one polymer with at least one carbon nanotube in a solvent. In certain embodiments, the solvent may comprise an organic solvent, and in other embodiments the solvent may comprise an aqueous solvent. The method further comprises the at least one polymer interacting with the at least one carbon nanotube's surface via π-stacking. In certain embodiments, the at least one polymer functionalizes the at least one carbon nanotube.

In still another embodiment, a composition is provided. The composition comprises a polymer associated with a nanotube, wherein the polymer comprises a backbone portion for associating with the nanotube in a non-wrapping fashion. Preferably, the polymer backbone portion associates with the nanotube by non-covalently bonding with the nanotube in the non-wrapping fashion. For example, the polymer backbone may associate with the nanotube's surface via π-stacking interaction therewith.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Various embodiments of the present invention are now described with reference to the above figures. Embodiments of the present invention provide a new approach to functionalizing nanotubes. This approach is based on a discovery that carbon nanotube surfaces can be functionalized in a non-wrapping fashion by functional conjugated polymers. Advantageously, certain embodiments of the present invention may enable functionalization of nanotubes in organic solvents, and certain embodiments may enable functionalization of nanotubes in aqueous solvents.

Figure 2A:
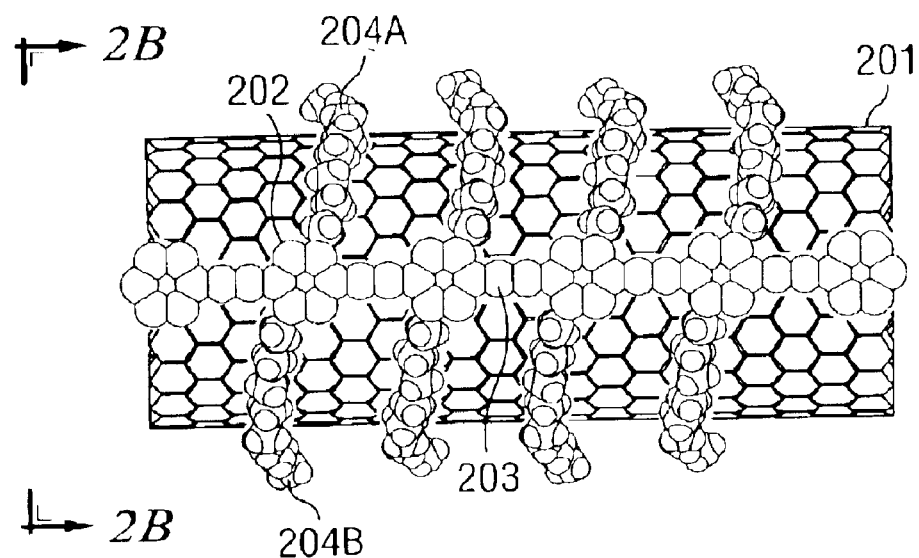
FIGS. 2A–2B show an example molecular model of a polymer that associates with a carbon nanotube in a non-wrapping fashion in accordance with an embodiment of the present invention.
Figure 2B:
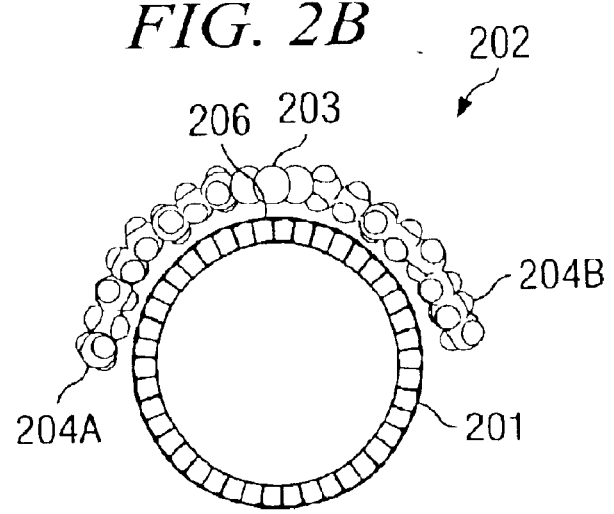

For instance, an example molecular model of a polymer that associates (e.g., noncovalently bonds) with a carbon nanotube in a non-wrapping fashion is shown in FIGS. 2A–2B. FIG. 2B is a cross-sectional view of FIG. 2A taken as indicated in FIG. 2A. As shown in this example, a carbon nanotube (and more specifically a single-walled carbon nanotube in this example) 201 has polymer 202 associated with it in a non-wrapping fashion therewith.

Polymer 202 comprises a relatively rigid backbone 203 that associates with carbon nanotube 201 substantially along the length, as opposed to about the diameter, of such carbon nanotube 201. Thus, polymer 202 associates with carbon nanotube 201 in a non-wrapping fashion, which is advantageous for various reasons, some of which are described more fully herein. In this example, backbone 203 associates with nanotube 201 (e.g., via π-stacking interaction therewith) wherein such backbone 203 extends substantially along the length of nanotube 201 without any portion of backbone 203 extending over more than half of the diameter of nanotube 201 in relation to any other portion of backbone 203. For instance, backbone 203 is sufficiently rigid such that no portion thereof bends to the extent that such portion passes the half-diameter (or "equator line") 205 of nanotube 201 relative to location 206 of nanotube 201 at which at least a portion of backbone 203 is associated with nanotube 201. The specific rigidity of various backbones 203 that may be implemented in accordance with embodiments of the present invention may vary (e.g., certain implementations may enable a portion of backbone 203 to bend beyond half-diameter 205 while another portion of such backbone is arranged at location 206 of nanotube 201), but such backbones 203 are preferably sufficiently rigid such that they do not wrap (i.e., fully envelop the diameter of) nanotube 201. Of course, as shown in the example of FIGS. 2A–2B, portions of polymer 202 (e.g., functional extensions 204A and 204B) may extend about all or a portion of the diameter of nanotube 201, but backbone 203 of polymer 202 is preferably sufficiently rigid such that it does not wrap about the diameter of nanotube 201.

Polymer 202 may further comprise various functional extensions from backbone 203, such as functional extensions 204A and 204B, which may comprise any of various desired functional groups for functionalizing carbon nanotube 201. As described further herein, embodiments of the present invention include functional groups in polymer 202 that are suitable for functionalizing carbon nanotube 201 in any of various desired ways, including without limitation solubilizing carbon nanotube 201, functionalizing carbon nanotube 201 to act as a sensor (e.g., a biological sensor), and/or implementing "chemical handles" on carbon nanotube 201.

Figure 1A:
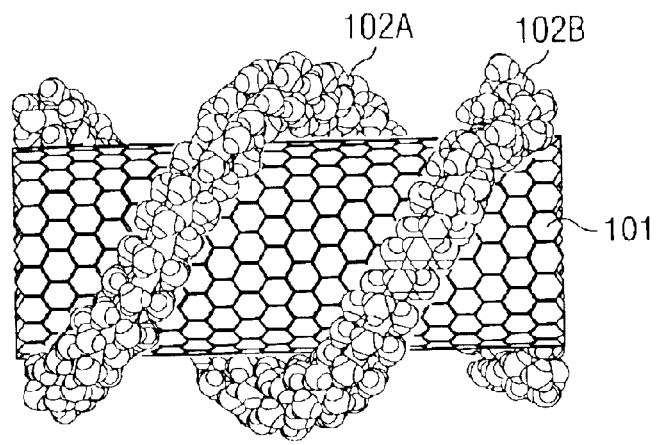
FIGS. 1A–1C show examples of polymer wrapping of carbon nanotubes of the prior art.
Figure 1B:
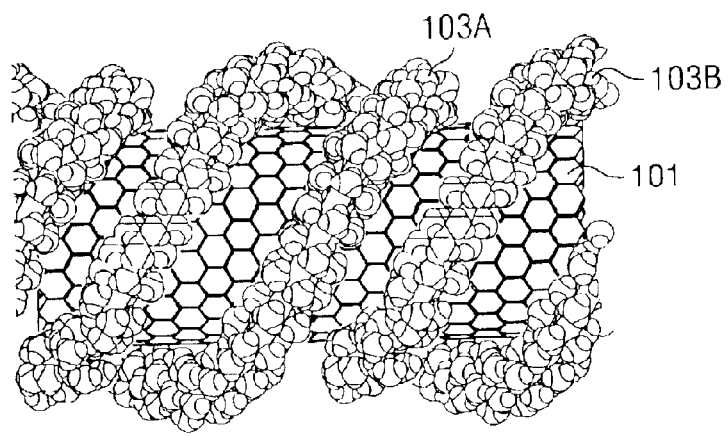
Figure 1C:
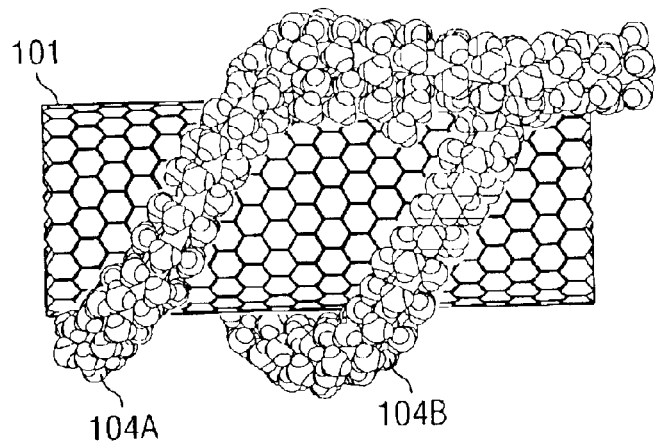

Compared to preparing polymer-wrapped carbon nanotubes (of FIGS. 1A–1C), the non-wrapping approach of embodiments of the present invention should allow better control over the distance between functional groups on the carbon nanotube surface by precisely varying the length and constitution of 1's backbone (or other selected backbone) and side chain. This strategy opens the door to the (semi-) site-controlled noncovalent functionalization of carbon nanotube surfaces. Such functionalization may introduce numerous neutral and ionic functional groups onto the carbon nanotube surfaces. It may provide "chemical handles" for manipulation and assembly of carbon nanotubes, enabling applications in a variety of areas such as chemical and biological sensing.

Thus, one advantage of polymer 202 associating with carbon nanotube 201 (e.g., via π-stacking interaction) in a non-wrapping fashion is that it enables functional groups, such as functional extensions 204A and 204B, to be arranged along backbone 203 in a desired manner to accurately control the spacing of such functional groups. In polymers that associate with a carbon nanotube in a wrapping fashion, it becomes much more difficult to control the relative spacing of the functional groups arranged on the polymer because their spacing is dependent on the wrapping of the polymer. By controlling the spacing of such functional groups along backbone 202, more control may be provided over if/how the functional groups interact with each other, carbon nanotube 201, and/or other elements to which the functional groups may be exposed.

Another advantage of such noncovalent functionalization of carbon nanotubes is that it allows for a significant degree of functionalization to be added to carbon nanotube surfaces (sidewalls) while still preserving nearly all of the nanotubes' intrinsic properties. That is, as described above, carbon nanotubes possess a very desirable and unique combination of physical properties relating to, for example, strength, weight, electrical conductivity, etc. Having the ability to functionalize carbon nanotubes while preserving nearly all of the nanotubes' properties thus offers many advantages. For instance, in certain applications, carbon nanotubes may be solubilized and thus used in forming a desired composition of matter (or "material") that has desired properties supplied at least in part by the nanotubes. That is, suitable functional groups for solubilizing the nanotube may be included in the polymer in certain embodiments of the present invention.

Figure 3A:
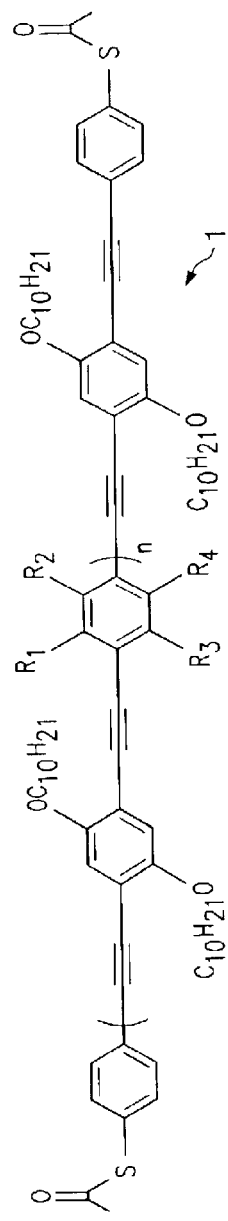
FIGS. 3A–3C show example polymer structures of embodiments of the present invention.
Figure 3C:
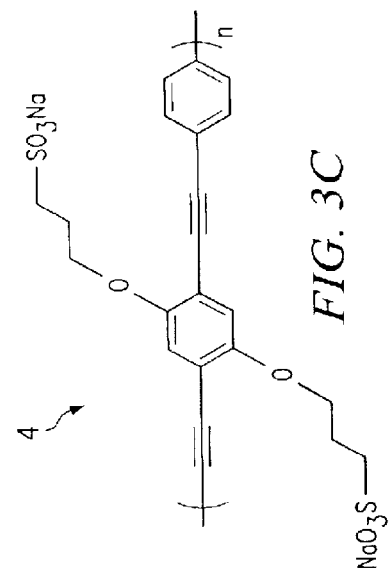
Figure 3B:
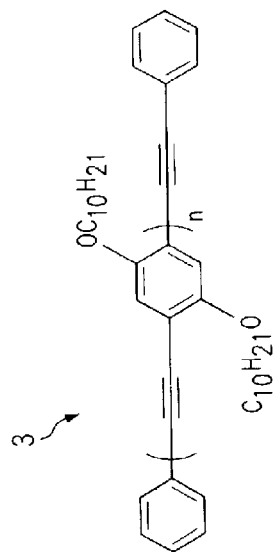

As an example of a technique for functionalizing carbon nanotubes, we have conducted a study in which we used rigid functional conjugated polymers, poly(aryleneethynylene)s (also referred to as "1", "3", "4" herein). See Bunz, U.H.F. Chem. Rev. 2000, 100, 1605–1644 and McQuade, D. T et al., J. Am. Chem. Soc. 2000, 122, 12389–12390, the disclosures of which are hereby incorporated herein by reference, and poly(3-decylthiophene) (also referred to as "2" herein). FIGS. 3A–3C show example polymer structures of embodiments of the present invention. More specifically, FIG. 3A shows an example poly(aryleneethynylene) (labeled "1") polymer structure that may be used to noncovalently bond with a carbon nanotube in a non-wrapping fashion. The example polymer structure shown in FIG. 3A comprises functional extensions $R_1$, $R_2$, $R_3$, and $R_4$, which may, in alternative example implementations, be implemented as either 1a, 1b, 1c, or 1d shown hereafter:

$$R_1 = R_4 = H, R_2 = R_3 = OC_{10}H_{21} \tag{1a}$$

$$R_1 = R_2 = R_3 = R_4 = F \tag{1b}$$

$$(1c)$$

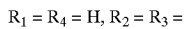

$R_1 = R_4 = H, R_2 = R_3 = $

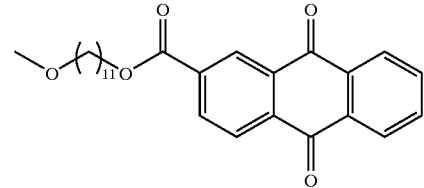

$$(1d)$$

$R_1 = R_4 = H, R_2 = R_3 = $ 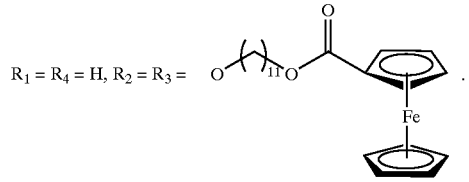

FIG. 3B shows another example poly(aryleneethynylene) (labeled "3" and referred to herein as "3") polymer structure that may be used to noncovalently bond with a carbon nanotube in a non-wrapping fashion. Further, FIG. 3C shows another example poly(aryleneethynylene) (labeled "4" and referred to herein as "4") polymer structure that may be used to noncovalently bond with a carbon nanotube in a non-wrapping fashion. While the example polymer structures 1, 3, and 4 shown in FIGS. 3A–3C are poly(phenyleneethynylene) structures, it should be understood that other poly(aryleneethynylene)-type structures may be used in accordance with embodiments of the present invention.

The example polymer structures of FIGS. 3A–3C may be implemented for noncovalently bonding with a carbon nanotube in a non-wrapping fashion, as with the example shown in FIGS. 2A–2B. Indeed, the example molecular model of FIGS. 2A–2B illustrates an example of implementation 1a, described above, of the polymer of FIG. 3A, and more specifically it shows an example of implementation $1a_{n=1.5}$-$SWNT_{(6,6)}$ complex (i.e., armchair SWNT), wherein n is the repeat number. It should be understood that the present invention is not intended to be limited solely to the example functional groups of 1a, 1b, 1c, and 1d (or the functional groups of polymer structures 3 and 4) shown above for functionalizing carbon nanotubes, but rather any such functional group now known or later developed for functionalizing carbon nanotubes may be used in accordance with embodiments of the present invention. Preferably, the functional group(s) included in the polymer do not substantially alter the intrinsic properties of the carbon nanotube. Further, it should be understood that while the example functional groups 1a–1d solubilize a carbon nanotube, various other types of functional groups may be included for functionalizing a nanotube in any of various other ways, for example for implementing a chemical handle, performing biological sensing, etc.

Figure 4:
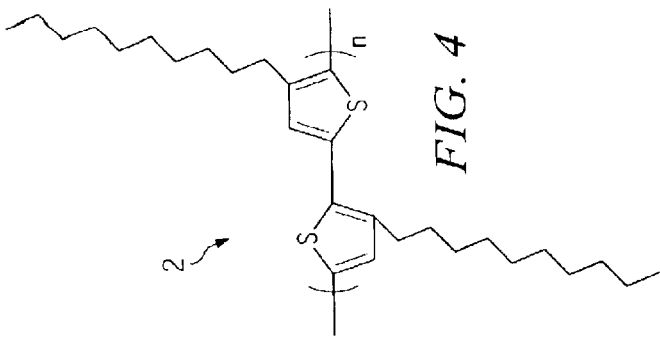
FIG. 4 shows another example of a polymer structure that may be implemented for associating with a carbon nanotube in a non-wrapping fashion in accordance with an embodiment of the present invention.

FIG. 4 shows another example of a polymer structure that may be implemented for noncovalently bonding with a carbon nanotube in a non-wrapping fashion. More specifically, FIG. 4 shows an example structure of a highly regioregular head-to-tail poly(3-decylthiophene) (labeled "2") that may be implemented in certain embodiments of the present invention.

In contrast to previous work, See Dalton, Star, and O'Connell, M. J. et al., the backbone of 1, 2, 3, and 4 described above is rigid and cannot wrap around the SWNTs, and the major interaction between the polymer backbone and the nanotube surface is parallel π-stacking. Further, the example backbones 5–18 described below are also rigid such that they do not wrap around the nanotube, and the major interaction between such polymer backbones and the nanotube surface is parallel π-stacking. Parallel π-stacking is one type of noncovalent bonding. See Chen, R. J. et al., *J. Am. Chem. Soc.*, 2001, 123, 3838–3839, the disclosure of which is hereby incorporated herein by reference. Certain techniques disclosed herein utilize such polymers to enable functionalization of various types of carbon nanotubes in organic solvents (such as $CHCl_3$, chlorobenzene etc).

The new polymers (1a-1, $n_{average}$=19.5; 1a-2, $n_{average}$=13; 1b, $n_{average}$=19; 1c, $n_{average}$=19; 1d) were synthesized and characterized according to known methods. See Bunz, U. H. F. Chem. Rev. 2000, 100, 1605–1644, the disclosure of which is hereby incorporated herein by reference. Three types of SWNTs were used in this study: 1) purified HiPco-SWNTs ("$SWNTs_{HiPco}$", from Carbon Nanotechnologies, Inc.); 2) purified laser-grown SWNTs ("$SWNTs_{laser}$"); and 3) purified electric arc-grown SWNTs ("$SWNTs_{arc}$"). As an example preparation procedure for 1a-$SWNTs_{HiPco}$ complex: 14.7 mg of $SWNTs_{HiPco}$ was sonicated in 29.4 ml of $CHCl_3$ for 30 minutes ("min") to give an unstable suspension of visible insoluble solids. 14.7 mg of 1a was then added and most of the visible insoluble solids became soluble simply by vigorous shaking. The resulting solution was further sonicated for 10–30 min to give a black-colored stable solution with no detectable solid precipitation for over 10 days. Such resulting black-colored and unsaturated carbon nanotube solution was visually nonscattering and no precipitation occurred upon prolonged standing (e.g., over 10 days). The product was collected by PTFE membrane filtration (0.2–0.8 μm pore size), washed with $CHCl_3$, and dried at room temperature under vacuum to give 20.6 mg of free-standing black solid film (bucky paper).

The procedures followed in my study for 2-$SWNTs_{HiPco}$, 1c-$SWNTs_{HiPco}$, 1b-$SWNTs_{HiPco}$, 1d-$SWNTs_{HiPco}$, 3-$SWNTs_{HiPco}$, 1a-$SWNTs_{laser}$ and 1a-$SWNTs_{arc}$ are similar to that described above for 1a-$SWNTs_{HiPco}$. The as-prepared $SWNTs_{HiPco}$ and CVD-grown multi-walled carbon nanotubes (MWNTs) can also be functionalized (e.g., solubilized) in $CHCl_3$ by a similar procedure. The as-prepared $SWNTs_{arc}$, however, form an unstable suspension using a similar procedure, presumably due to the amorphous carbon coating on nanotubes that prevents the efficient π-π interaction between 1 and the nanotube surfaces.

The PTFE membrane filtration and $CHCl_3$ washing steps were used to remove free 1a. According to the weight gain, the weight ratio ($WR_{final}$) of 1a:$SWNTs_{HiPco}$ in the final product is estimated to be about 0.38–0.40, which is independent of $WR_{initial}$. For example, the WR data in three 1a:$SWNTs_{HiPco}$ reactions are as follows: 1) $W_{initial}$=1.00, $WR_{final}$=0.40; 2) $WR_{initial}$=0.40, $WR_{final}$=0.38; 3) $WR_{initial}$=0.40, $WR_{final}$=0.39. Although this estimate is still rough, it strongly suggests that 1 could form stable and irreversibly bound complexes with carbon nanotubes in $CHCl_3$, instead of a simple mixture.

The example molecular structure of 1a-$SWNT_{(6,6)}$ shown in FIGS. 2A–2B was obtained by modeling. The $1a_{n=1.5}$-$SWNT_{(6,6)}$ complex's structure was fully optimized using the UFF empirical potential. According to this model and considering the steric effect, it is most likely that one polymer complexes one $SWNT_{HiPco}$ (0.7–0.8 nm in diameter) per length of one polymer. The calculated WR of 1a:$SWNT_{HiPco}$ based on this assumption is about 0.5–0.6, which is slightly higher than the experimental value $WR_{final}$ (0.38–0.40). The difference may arise from the existence of nanotube ropes and impurities such as metal catalyst in $SWNTs_{HiPco}$. In the case of $SWNTs_{laser}$ (1.1–1.3 nm in diameter) and $SWNTs_{arc}$ (1.3–1.5 nm in diameter), it is possible that two polymers complex one SWNT per length of one polymer. Compared to $SWNTs_{HiPco}$, the $SWNTs_{laser}$ and $SWNTs_{arc}$ are less pure.

Figure 5:
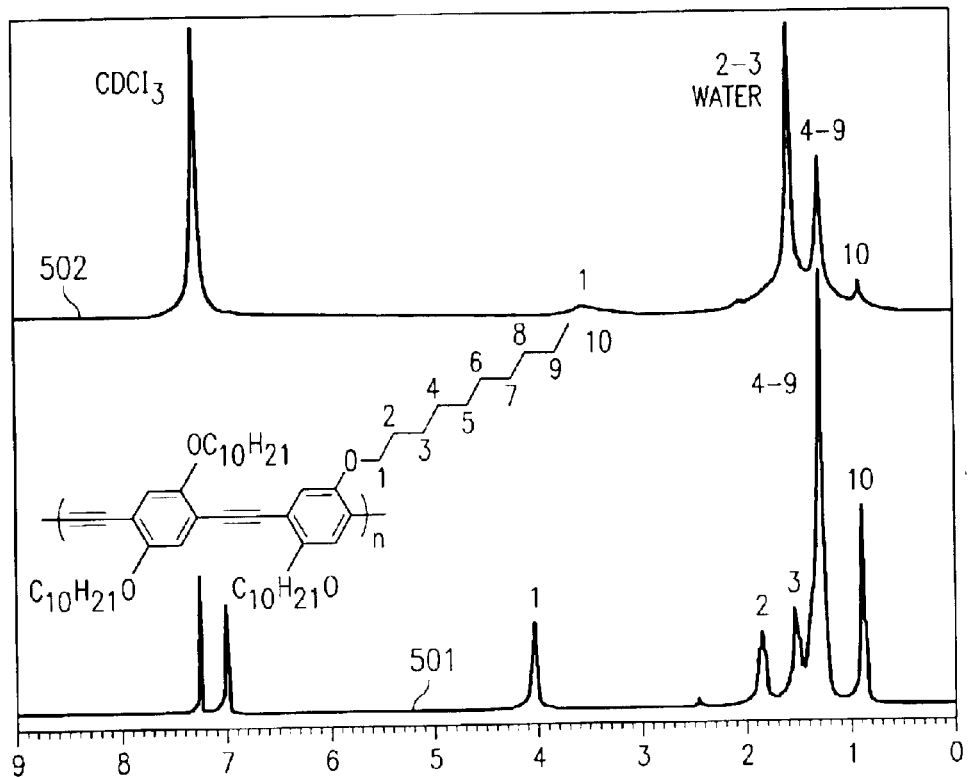
FIG. 5 shows the $^1$H NMR spectra (300 MHz, CDCl$_3$) of an example polymer (1a) (shown at the bottom) and the complex resulting from the association of the example polymer with a single-walled carbon nanotube (1a-SWNTs$_{HiPco}$ complex) (shown at the top)

As shown in FIG. 5, compared to that of free 1a (δ 4.05), $^1$H NMR spectrum of 1a-$SWNTs_{HiPco}$ shows a significant upfield shift (δ 3.51) of the $CH_2$ group ($C_1$) that is closest to the aromatic group and nanotube surface. That is, FIG. 5 shows a first graph 501 showing the $^1$H NMR spectra (300 MHz, $CDCl_3$) of free 1a and a second graph 502 showing the resulting $^1$H NMR spectra (300 MHz, $CDCl_3$) of 1a-$SWNTs_{HiPco}$. There is prior theoretical evidence for the existence of large diamagnetic ring currents in carbon nanotubes. Due to the presence of trace water, we did not determine the chemical shift of the $C_2$ group. No substantial change is observed for the other $CH_2$ groups, indicating that, although the polymer backbone is tightly attached to the nanotube surface via π-stacking, the side chain ($C_3$–$C_{10}$) of 1a is relatively free in solution. The signal of the phenylene group that is closely associated with the nanotube surface is too broad to be detected. The $^1$H NMR spectrum of 1a-$SWNTs_{laser}$ gives a similar result.

Figure 6A:
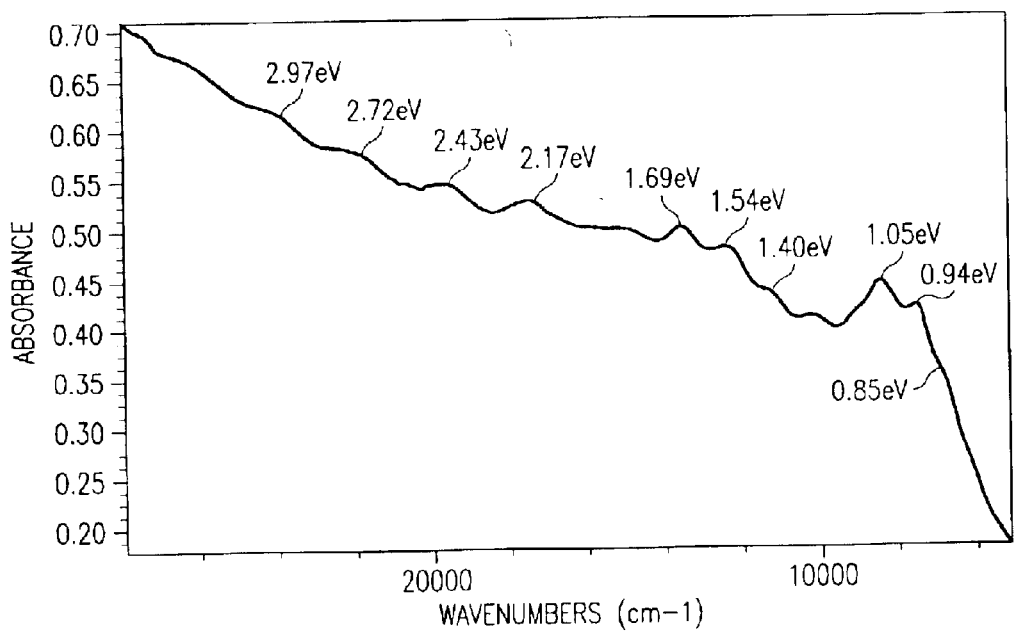
FIG. 6A shows a graph illustrating the thin film visible and near infrared (IR) spectra of SWNTs$_{HiPco}$ (without a polymer associated therewith)
Figure 6B:
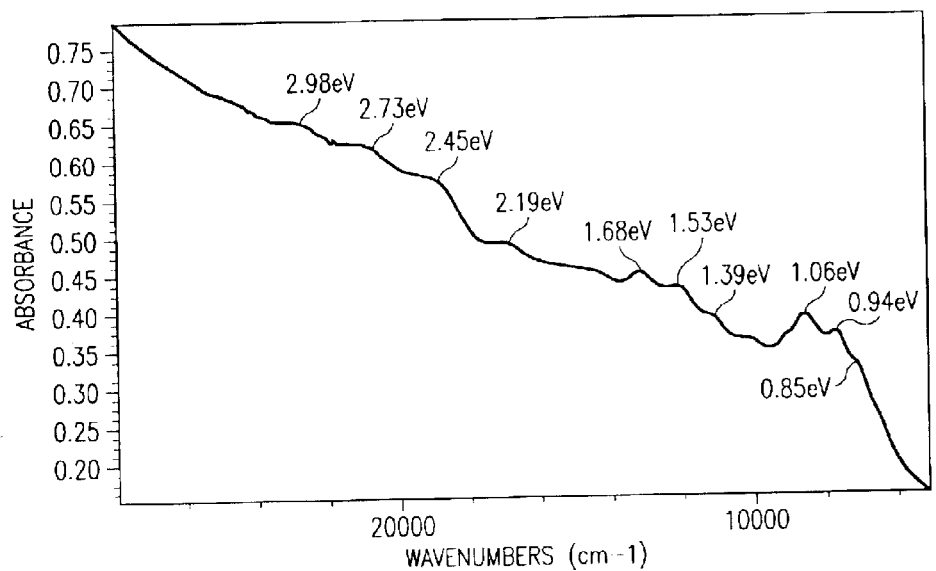
FIG. 6B shows a graph illustrating the thin film visible and near IR spectra of SWNTs$_{HiPco}$ functionalized by an example polymer of an embodiment of the present invention.

A preferred embodiment of the present invention provides a polymer for functionalizing carbon nanotubes while preserving nearly all of the nanotubes' intrinsic properties. For instance, FIG. 6A shows a graph illustrating the thin film visible and near infrared (IR) spectra of $SWNTs_{HiPco}$ (without a polymer associated therewith). FIG. 6B shows a graph illustrating the thin film visible and near IR spectra of 1a-$SWNTs_{HiPco}$. According to the thin film visible and near-IR spectroscopies, the band structures of 1a-$SWNTs_{HiPco}$ (of FIG. 6B) are very similar to those of pristine $SWNTs_{HiPco}$ (of FIG. 6A), indicating that the electronic structures of $SWNTs_{HiPco}$ are basically intact upon polymer complexation. The charge-transfer in 1a-$SWNTs_{HiPco}$ is believed to be insignificant based on both absorption and Raman spectra. It should be noted that in the spectrum of 1a-$SWNTs_{HiPco}$ (of FIG. 6B) there is a very broad signal that is overlapped with those of SWNTs$_{HiPco}$ (of FIG. 6A) between 3.5 and 2 eV, which presumably arises from the lowest energy absorption of 1a in the nanotube complex.

The bucky paper made of 1-SWNTs$_{HiPco}$ complex (Tensile strength=28.3 MPa; Young's modulus=4.5 GPa) demonstrates a significant improvement in mechanical properties compared to those of bucky paper made of pure SWNTs$_{HiPco}$ (Tensile strength=9.74 MPa; Young's modulus=0.26 GPa). Both types of bucky papers were produced by the same room temperature membrane filtration process (without any high temperature annealing) for better comparison. This shows that 1 can increase the adhesion between nanotubes via more efficient π-π interactions. Accordingly, the resulting bucky paper dissolves more slowly in CHCl$_3$ at a lower concentration (approximately 0.1–0.2 mg/ml of 1a-SWNTs$_{HiPco}$ in CHCl$_3$). For applications that require high nanotube concentration (for example, polymer composites), using 1-SWNTs (W=0.4) solution in CHCl$_3$ prepared in situ without filtration is recommended.

Various other functional polymers with π-conjugated backbone structures may also be used to functionalize carbon nanotubes in organic solvents in accordance with alternative embodiments of the present invention. Some of such polymer backbone structures are shown as below (R represents any organic functional group; Ar represents any π-conjugated structure), as structures 5–18:

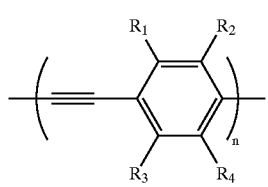

5

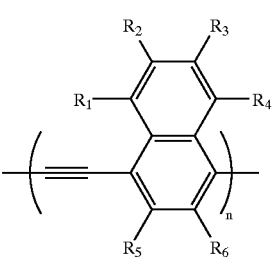

6

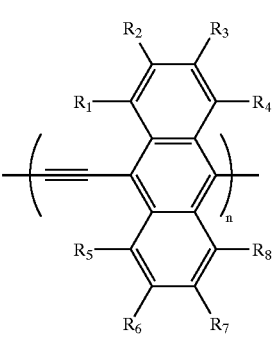

7

-continued

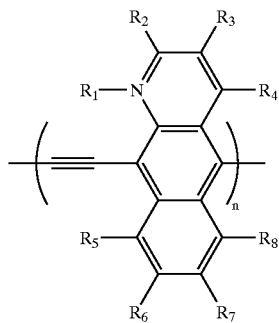

8

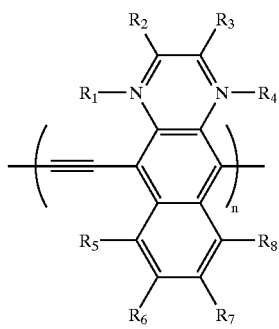

9

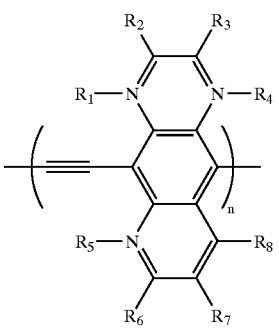

10

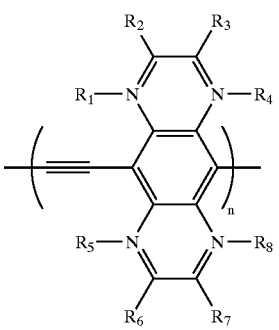

11

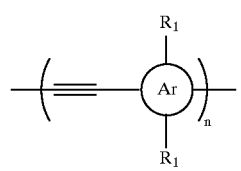

12

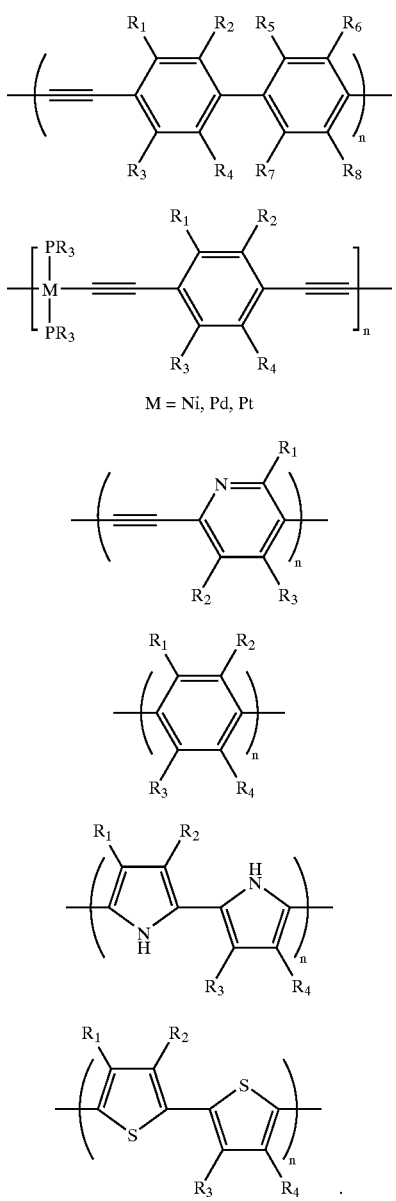

M = Ni, Pd, Pt

In the above backbones 5–18, n is preferably greater than or equal to 2, and R represents any organic functional group, such as R=$OC_{10}H_{21}$, R=$C_{10}H_{21}$, or other desired functional group. It should be recognized that the example backbones 5–15 are poly (aryleneethynylene)s, backbone 16 is a polyphenylene, backbone 17 is a polypyrrole, and backbone 18 is a polythiophene.

The 1-SWNTs$_{HiPco}$ solution of a preferred embodiment can mix homogeneously with other polymer solutions such as polycarbonate and polystyrene. Homogeneous nanotube-polycarbonate and -polystyrene composites can be prepared by removing the organic solvents.

As an example, 0.6 ml of a chloroform solution (125 mg/ml) of poly(bisphenol A carbonate) was homogeneously mixed with 2.89 ml of a chloroform solution (1.3 mg/ml of SWNTs$_{HiPco}$) of 1a-SWNTs$_{HiPco}$. A homogeneous SWNTs/poly(bisphenol A carbonate) composite (5 wt % of SWNTs$_{HiPco}$) was formed after removing the chloroform solvent. By varying the ration of 1a-SWNTs$_{HiPco}$:poly (bisphenol A carbonate), a series of SWNTs/poly(bisphenol A carbonate) composites with different SWNTs fillings can be easily made.

Soluble 1-SWNTs$_{HiPco}$ complex significantly improves the mechanical properties of commercial polymers. For example, the tensile strength and break strain of pure poly (bisphenol A carbonate) are 26 MPa and 1.23%, respectively; 3.8 wt % of SWNTs$_{HiPco}$ filling results in 68% and 1800% increases in tensile strength (43.7 MPa) and break strain (19.1%) of poly(bisphenol A carbonate) (average $M_W$ approximately 64,000), respectively.

Figure 7A:
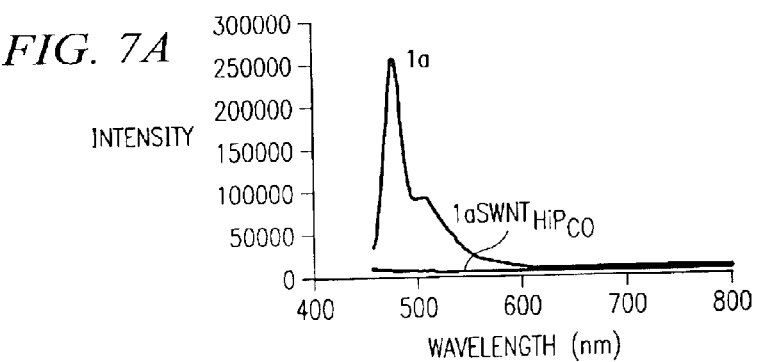
FIG. 7A shows the room-temperature solution-phase (CHCl$_3$) fluorescence spectra (excitation wavelength: 400 nm) of an example polymer (1a) and the complex resulting from the association of the example polymer with a single-walled carbon nanotube (1a-SWNTs$_{HiPco}$ complex)
Figure 7B:
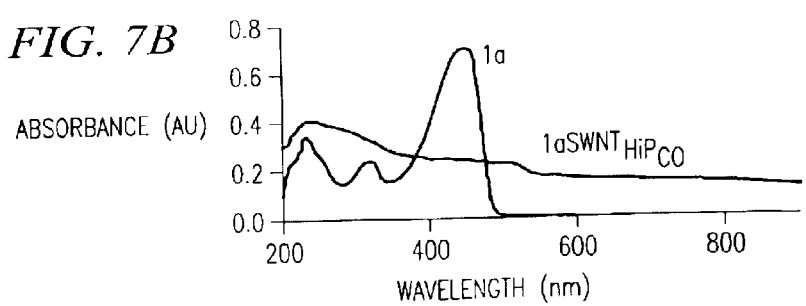
FIG. 7B shows the room-temperature solution-phase UV-visible spectra of an example polymer (1a) and the complex resulting from the association of the example polymer with a single-walled carbon nanotube (1a-SWNTs$_{HiPco}$ complex).

As a result of π-π interactions between the polymer backbone and the nanotube surface, the major absorption bands of 1a are significantly broadened in the 1a-SWNTs$_{HiPco}$ complex, as shown in FIGS. 7A–7B. More specifically, FIG. 7A shows room-temperature solution-phase (CHCl3) fluorescence spectra (excitation wavelength: 400 nm) of 1a and the 1a-SWNTs$_{HiPco}$ complex, and FIG. 7B shows the ultra-violet (UV)-visible spectra of 1a and the 1a-SWNTs$_{HiPco}$ complex. The strong fluorescence of 1a is efficiently quenched in the 1a-SWNTs$_{HiPco}$ complex by nanotube surfaces, which is further confirmed by fluorescence microscopy. Energy transfer quenching between molecules and for molecules on metal surfaces is well known.

In view of the above, it should be recognized that embodiments of the present invention provide a molecular structure that is capable of noncovalently bonding with a nanotube (e.g., carbon nanotube) in a non-wrapping manner. Further, the molecular structure may comprise one or more functional groups for functionalizing the nanotube to which the molecular structure associates. Preferably, the molecular structure forms a noncovalent bond with the nanotube; however, in certain implementations the molecular structure may be such that it forms a covalent bond with the nanotube in a non-wrapping fashion.

Functionalizing nanotubes through use of a non-wrapping polymer in accordance with embodiments of the present invention may provide several advantages. For example, solubilization of nanotubes allows for their use in enhancing the properties of various compositions of matter, including, as one example, plastics. Insoluble nanotubes cannot be dispersed homogeneously in commercial plastics and adhesives; therefore the polymer composites made by the addition of insoluble nanotubes gave little improvement in mechanical performance of plastics (Ajayan, P. M. et al., Adv. Mater. 2000, 12, 750; Schadler, L. S. et al. Appl. Phys. Lett. 1998, 73, 3842). In contrast, soluble nanotubes can significantly improve the mechanical performance of plastics, for example. For example, the tensile strength and break strain of pure poly(bisphenol A carbonate) are 26 MPa and 1.23%, respectively; 3.8 wt % of SWNTs$_{HiPco}$ filling results in 68% and 1800% increases in tensile strength (43.7 MPa) and break strain (19.1%) of poly(bisphenol A carbonate) (average $M_W$ approximately 64,000), respectively.

While various examples above are described for functionalizing carbon nanotubes, and more particularly single-walled carbon nanotubes, embodiments of the present invention are not intended to be limited solely in application to carbon nanotubes. Nanotubes may be formed from various materials such as, for example, carbon, boron nitride, and composites thereof. The nanotubes may be single-walled nanotubes or multi-walled nanotubes. Thus, while examples are described herein above for functionalizing carbon nanotubes, certain embodiments of the present invention may be utilized for functionalizing various other types of nanotubes, including without limitation multi-walled carbon nanotubes (MWNTs), boron nitride nanotubes, and composites thereof. Accordingly, as used herein, the term "nanotubes" is not limited solely to carbon nanotubes. Rather, the term "nanotubes" is used broadly herein and, unless otherwise qualified, is intended to encompass any type of nanotube now known or later developed.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of functionalizing a nanotube, said method comprising:
    noncovalently bonding a polymer comprising at least one functional group with a nanotube in a non-wrapping fashion.

2. The method of claim 1 further comprising mixing said polymer and said nanotube in a solvent under conditions whereby said polymer noncovalently bonds with said nanotube in said non-wrapping fashion.

3. The method of claim 2 wherein said solvent comprises an organic solvent.

4. The method of claim 2 wherein said solvent comprises an aqueous solvent.

5. The method of claim 2 wherein said solvent comprises one selected from the group consisting of:
    chloroform, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, and 1,4-dichlorobenzene.

6. The method of claim 1 wherein said polymer comprises a backbone portion that noncovalenty bonds with said nanotube in a non-wrapping fashion via π-stacking.

7. The method of claim 1 wherein said nanotube is a carbon nanotube.

8. The method of claim 1 wherein said polymer comprises a poly(aryleneethynylene).

9. The method of claim 1 wherein said polymer comprises a poly(phenyleneethynylene).

10. The method of claim 1 wherein said polymer comprises poly(3-decylthiophene).

11. A product resulting from the process of claim 1.

12. A method of functionalizing carbon nanotubes, said method comprising:
    interacting at least one polymer comprising at least one functional group with at least one carbon nanotube in a solvent, wherein said polymer interacts with said at least one carbon nanotube's surface in a non-wrapping fashion via π-stacking.

13. The method of claim 12 further comprising:
    interacting said at least one polymer with said at least one carbon nanotube by mixing.

14. The method of claim 12 wherein said at least one polymer noncovalently bonds with said at least one carbon nanotube in a non-wrapping fashion.

15. The method of claim 12 wherein said at least one polymer comprises a poly(aryleneethynylene).

16. The method of claim 12 wherein said at least one polymer comprises a poly(phenyleneethynylene).

17. The method of claim 12 wherein said at least one polymer comprises poly(3-decylthiophene).

18. A product resulting from the process of claim 12.

19. A composition comprising:
    a polymer associated with a nanotube, wherein said polymer comprises a backbone portion for noncovalently associating with said nanotube in a non-wrapping fashion.

20. The composition of claim 19 wherein said backbone portion associates with the nanotube by non-covalently bonding with the nanotube in said non-wrapping fashion.

21. The composition of claim 19 wherein said backbone portion comprises a portion selected from the group consisting of:

a)

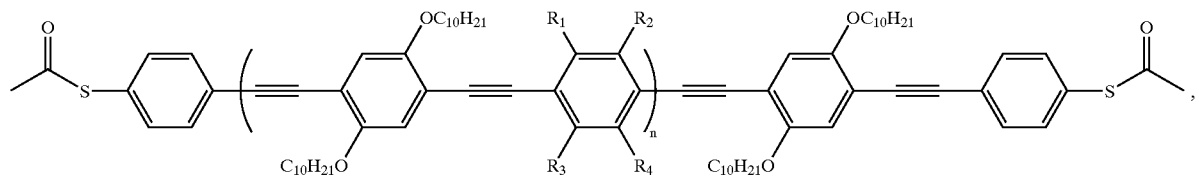

-continued
b) 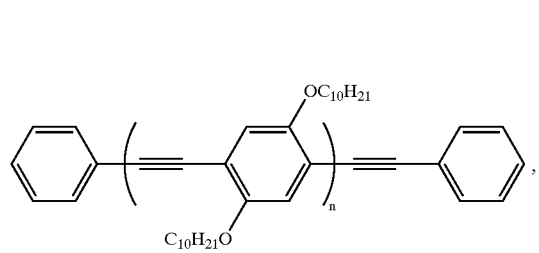
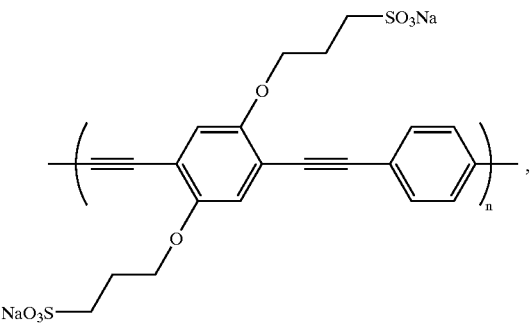
c) 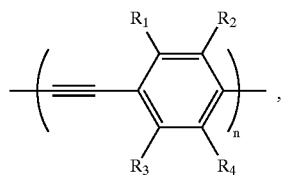
d) 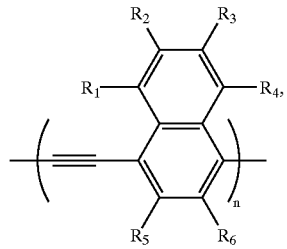
e) 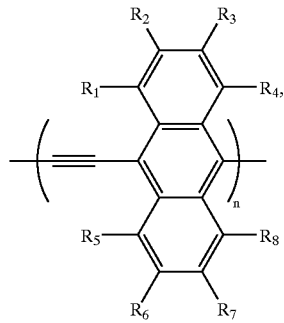
f) 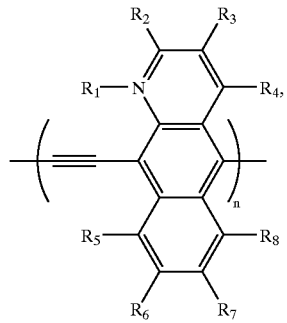
h) 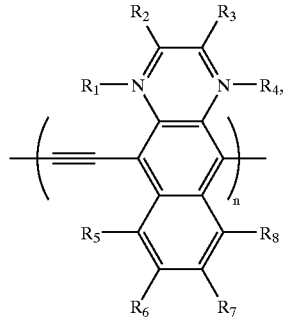
i) 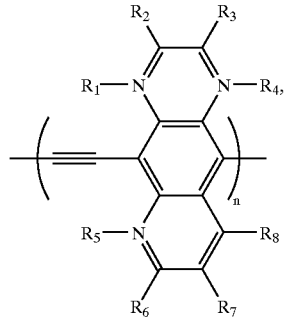
j) 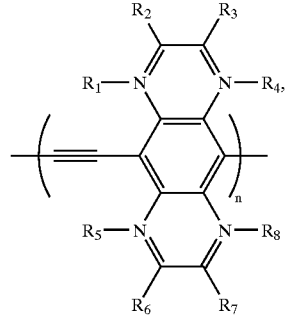
k) 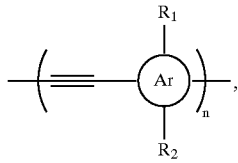

l)

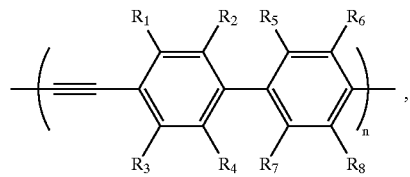

wherein M is n)

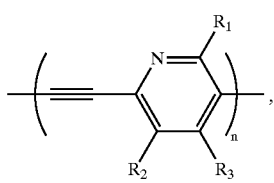

selected from the group consisting of Ni, Pd, and Pt, o)

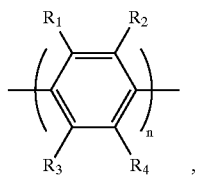

p)

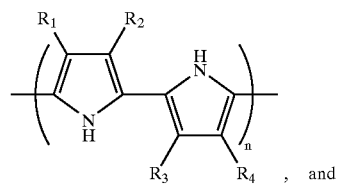

, and q)

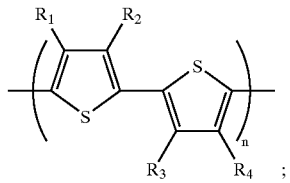

;

wherein each of $R_1$–$R_8$ in the above-listed backbone portions a)–q) represents a functional group.

22. The composition of claim 19 wherein said polymer comprises a poly(aryleneethynylene).

23. The composition of claim 22 wherein said polymer further comprises at least 4 functional portions ($R_1$, $R_2$, $R_3$, and $R_4$), wherein said functional portions comprise functional portions selected from the group consisting of:

a) $R_1=R_4=H$ and $R_2=R_3=OC_{10}H_{21}$,
b) $R_1=R_2=R_3=R_4=F$, m)

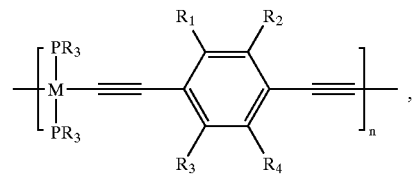

c) $R_1=R_4=H$ and $R_2=R_3=$

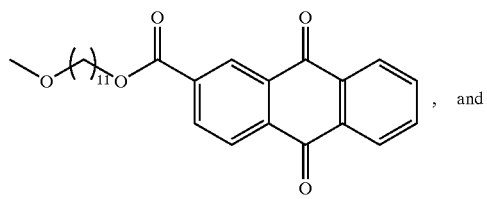

, and d) $R_1=R_4=H$ and $R_2=R_3=$

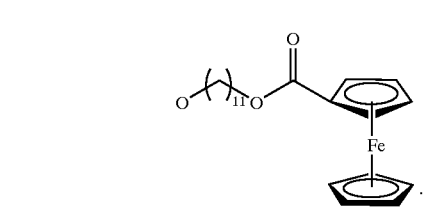

24. The composition of claim 19 wherein said polymer comprises at least one selected from the group consisting of: poly(phenyleneethynylene) and poly(3-decylthiophene).

25. The composition of claim 19 wherein said nanotube is a carbon nanotube.

26. The composition of claim 19 wherein said backbone portion associates with said nanotube's surface via π-stacking interaction therewith.

27. The composition of claim 19 wherein said polymer further comprises:

at least one functional portion for functionalizing said nanotube.

28. The composition of claim 27 wherein said at least one functional portion comprises at least one selected from the group consisting of: H, $OC_{10}H_{21}$, F,

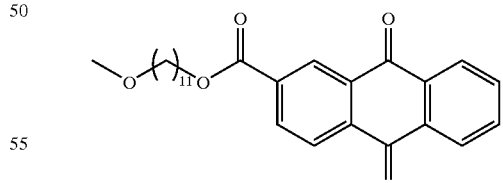

, and

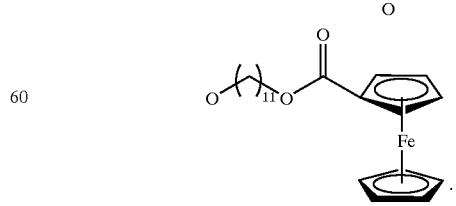

.

* * * * *